United States Patent [19]

Arrowood et al.

[11] Patent Number: 5,101,348
[45] Date of Patent: Mar. 31, 1992

[54] METHOD OF REDUCING THE AMOUNT OF INFORMATION INCLUDED IN TOPOLOGY DATABASE UPDATE MESSAGES IN A DATA COMMUNICATIONS NETWORK

[75] Inventors: Andrew H. Arrowood, Raleigh, N.C.; Kathryn E. Clarke, Little Silver, N.J.; John E. Drake, Jr., Pittsboro, N.C.; John L. Eisenbies, Raleigh, N.C.; James P. Gray, Chapel Hill, N.C.; Karla J. Norsworthy, Raleigh, N.C.; Diane P. Pozefsky, Chapel Hill, N.C.; Terence D. Smetanka, Raleigh, N.C.

[73] Assignee: International Business Machines Corporation, Armonk, N.Y.

[21] Appl. No.: 210,251

[22] Filed: Jun. 23, 1988

[51] Int. Cl.⁵ .............................................. G06F 13/14
[52] U.S. Cl. .................. 395/200; 364/284.3; 364/284; 364/284.4; 364/282.1; 364/DIG. 1
[58] Field of Search ... 364/200 MS File, 900 MS File; 370/94

[56] References Cited

U.S. PATENT DOCUMENTS

| | | | |
|---|---|---|---|
| 4,506,358 | 3/1985 | Montgomery | 370/60 |
| 4,532,625 | 7/1985 | Stover | 370/60 |
| 4,617,657 | 10/1986 | Drynan | 370/60 |
| 4,644,532 | 2/1987 | George | 370/94 |
| 4,670,871 | 6/1987 | Vaidya | 370/60 |
| 4,710,870 | 12/1987 | Blackwell | 364/200 |
| 4,712,214 | 12/1987 | Meltzer | 370/60 |
| 4,720,784 | 1/1988 | Radhakrishnan | 364/200 |
| 4,726,019 | 2/1988 | Adelmann | 370/60 |
| 4,745,559 | 5/1988 | Willis | 364/408 |
| 4,823,261 | 4/1989 | Bank | 364/200 |
| 4,827,411 | 5/1989 | Arrowood | 364/200 |
| 4,847,830 | 7/1989 | Momirov | 364/131 |

*Primary Examiner*—Thomas C. Lee
*Assistant Examiner*—Eric Coleman
*Attorney, Agent, or Firm*—Gerald R. Woods

[57] ABSTRACT

In a communications network, each network node can maintain its own list of network resources in a topology database. When the state of a resource "owned" by a particular node changes, that node broadcasts a topology database update (TDU) message to adjacent nodes. Each adjacent node updates its own topology database and rebroadcasts the message. To minimize the amount of information that must be included in TDU messages when two nodes are reconnected after an outage, each node assigns flow reduction sequence numbers (FRSNs) to TDU meassages and keeps a record of the FRSN for the last TDU message sent to an adjacent node. The node also records, for each resource in its database, the FRSN of the last TDU message including that resource. When two nodes are reconnected, the sending node includes in the TDU message only those resources having a FRSN greater than the FRSN assigned to the last TDU sent to the adjacent node to which the TDU message is directed.

8 Claims, 5 Drawing Sheets

EN—END NODE
NN—NETWORK NODE

METHOD OF REDUCING THE AMOUNT OF INFORMATION INCLUDED IN TOPOLOGY DATABASE UPDATE MESSAGES IN A DATA COMMUNICATIONS NETWORK

FIELD OF THE INVENTION

The present invention relates to communications networks and more particularly to a method of reducing the amount of information included in topology database update messages used in maintaining a common network topology database at different nodes in such networks.

For purposes of the following descriptions a communications network can be generally defined as a collection of network nodes and end nodes interconnected through communications links. A network node can be characterized as a data processing system that provides certain functions within the network, such as routing of messages between itself and its adjacent or neighboring nodes selection of routes for messages to be transmitted between a network node and an end node and the furnishing of directory services to connected end nodes. The links between nodes may be permanent communication links such as conventional cable connections or links that are enables only when needed, such as dial-up telephone connections. End nodes are exemplified by devices such as display terminals, intelligent workstations, printers and the like which do not provide routing or route selection or directory services to other nodes in the network. Collectively, the network nodes, the end nodes and the links between the nodes are referred to as network resources. The physical configuration and characteristics of the various nodes and links in a network are said to be the topology of the network.

Before a message can be transmitted between any two nodes in any network, a human operator or data processing equipment responsible for establishing the connections must have an accurate and up-to-date file or database on the network topology. Without such a database, an attempt to establish a connection may be doomed because the operator or equipment may unknowingly include non-existent nodes or inoperative links in the connection path.

Maintaining a complete, current topology database was not a major problem in early communications networks. Early networks were relatively simple with node to node communications being managed by a single processor or a relatively small number of processors.

The fact that control of communications was largely centralized made it feasible for a system operator to maintain a current topology database for the entire network. The single system operator could add resources to the topology database, change the status of current resources or delete resources no longer available in the network due to temporary failure or permanent physical removal from the network. Once the single system operator has constructed a current topology database, copies of that database could be transmitted to any processor in the system having communications control functions.

Communications networks are becoming larger and more complex. Communications control functions are not performed by a greater number of processors distributed throughout a network.

It is no longer thought practical for a single system operator to maintain a current topology database for a complex network with distributed communications control functions. Because there are more resources in such networks, there will be more changes in the status of those resources for an operator to keep up with. The volume and complexity of the changes increases the chances of human error in maintaining the topology database.

It is also thought impractical to distribute the task of maintaining the topology database along several system operators at different nodes since that approach requires continued careful coordination of inputs from operators who may be located at great distances and in considerably different time zones from one another. If the task of maintaining a topology database for the entire network is distributed along remote system operators, there is always a possibility that an error by one of the system operators will be cascaded with errors by other operators, leading to the creation of a grossly inaccurate topology database.

Reasonably successful attempts have been made to have the network equipment itself take over the task of maintaining a topology database without human intervention. Each processor performing a communication control function notifies other processors of changes in the status of network through the use of topology database update messages.

The general process of maintaining current network topology databases at each network node is as follows. When a resource is added to or deleted from the network of when characteristic of that resource changes, the network node which "owns" the resource generates a topology database update message containing information about the new status of the resource. The network node broadcasts the topology database update message to each of the network nodes to which it is directly connected. Each node receiving the topology database update message uses the contents of the message to update its local copy of the network topology database and then re-broadcasts the topology database update message to each of the network nodes to which it is directly connected other than the node from which it originally received the topology database update message. Information is included within the topology database update message which will eventually prevent useless re-broadcasting of the message to nodes which have already received it once.

If two nodes are connected for the first time or become reconnected after an outage, the present practice is for each node to send a topology database update message to the other containing information about all resources in the sending node's local copy of the network topology database. If the outage has relatively brief, few or no changes in the resources would have occurred. For that reason, much or possibly all of the information in the topology database update message would duplicate information already stored at the receiving node.

Every topology database update message transmitted through a network represents a form of overhead that retracts from the network's availability for transmission of user data. Therefore, minimizing the number of topology database update messages or the amount of information that is included within a topology database update message has a direct impact on the efficient use of network resources.

DISCLOSURE OF THE INVENTION

The present invention is a method which reduces the amount of information that must he sent to adjacent nodes in the form of topology database update messages in order to allow the adjacent noses to update their local copies of the network topology database at an initial or renewed connection between the nodes. A sending node assigns a unique sequence number to each topology database update message which it generates. The sending node also maintains a record of the most recent topology database update message previously sent to each adjacent node and, for each individual resource defined in its topology database, the sequence number of the most recent topology database update message in which the resource was included. When a topology database update message must be sent to an adjacent node at initial or renewed node-to-node connection, the sending node includes in the topology database update message only those resources having a stored sequence number greater than the sequence number of the most recent topology database update message previously sent to the node.

The sequence numbers discussed above may also be referred to as flow reduction sequence numbers or FRSNs to distinguish them from resource sequence numbers also used in maintenance of topology databases. If the term "sequence number" alone is used in the following technical description it should be assumed to be a reference to a flow reduction sequence number.

DISCLOSURE OF THE DRAWINGS

While the specification concludes with claims particularly pointing out and distinctly claiming that which is regarded as the present invention details of a preferred embodiment of the invention may be more readily ascertained from the following technical description when read in conjunction with the accompanying drawings wherein:

TECHNICAL DESCRIPTION

Figure 1:
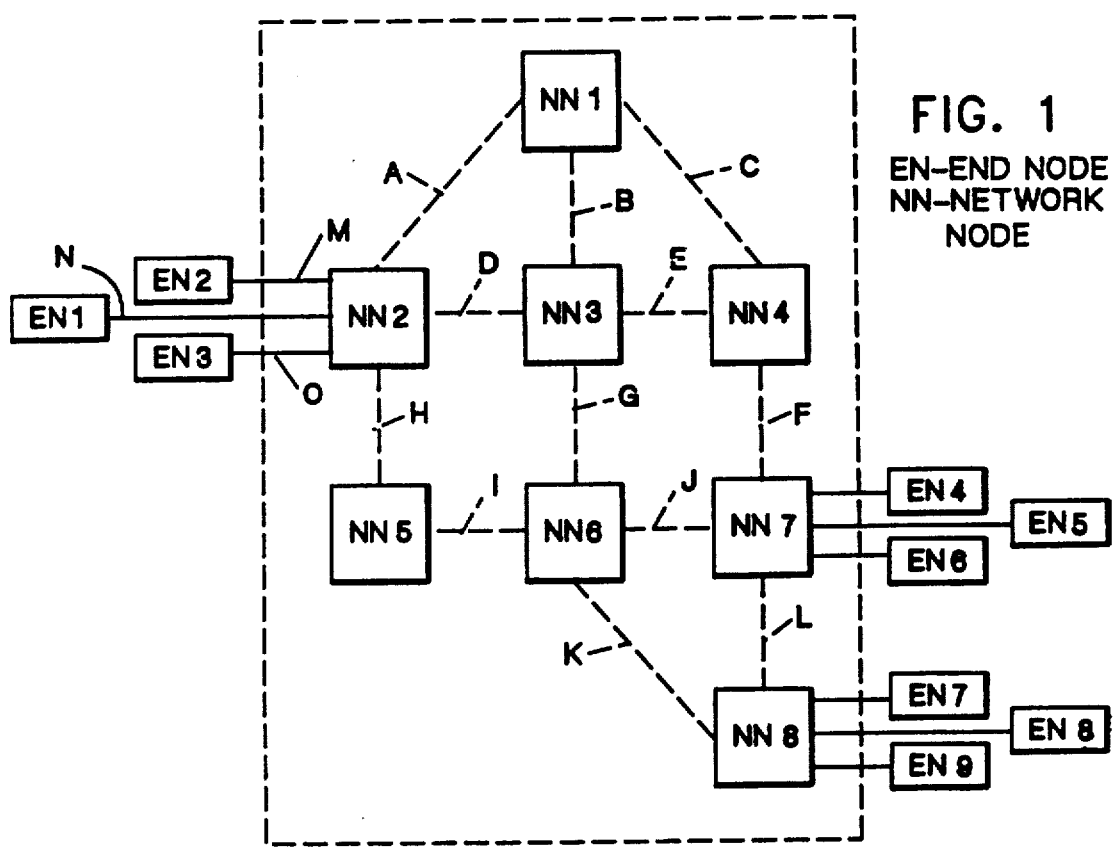
FIG. 1 is a block diagram of a representative communications network within which the present invention may be practiced.

FIG. 1 shows a representative communications network having eight network nodes NN1 through NN8. Each of those nodes is linked to at least one other node through communications links, such as links A through L. As mentioned earlier, each communications link may be either a permanent connection or a selectively enabled connection. Network nodes NN2, NN7 and NN8 are shown with attached end nodes EN1 through EN9. In practice, other network nodes might have attached end nodes. The network nodes NN1 through NN8 are data processing systems that provide certain communications services for their own end nodes and for other network nodes. The communications services provided by a network node include, among other things, the selection of communications routes between nodes, directory services and the maintenance of a network topology database, which the network node must have in order to determine the most appropriate route between nodes. The following technical description is concerned only with those functions that the network nodes perform in maintaining copies of the network topology database at the nodes.

Figure 2:
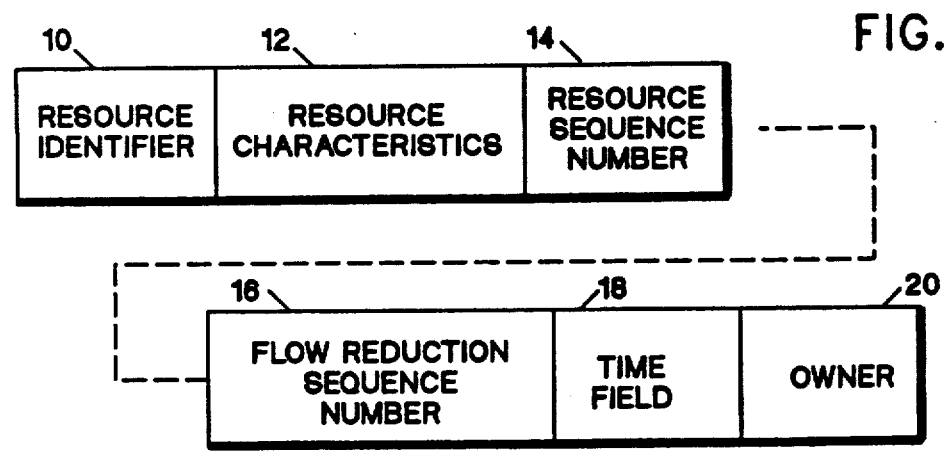
FIG. 2 depicts a resource record of the type stored in each network node copy of a network topology database.

Each network node maintains its own copy of the network topology database. This topology database is made up of a number of records each having the format shown in FIG. 2. Each record includes a network resource identifier field 10, a resource characteristic field 12, a resource sequence number field 14, a flow reduction sequence number field 16, a time field 18 and an "owner" field 20. The resource sequence number is used to assure that only current information about a resource is propagated through the network. The time field allows outdated resource entries to be deleted from the network topology database. A more complete description of the uses of the resource sequence number and the time field may be found in application Ser. No. 062,272 filed June 15, 1987 and assigned to the assignee of the present invention. Neither the applications of these fields nor the contents of the referenced application is essential to an understanding of the present invention. The "owner" field defines the particular resource as one that either is "owned" by the local network node or as one that "belongs" to a remote network node. More details about the role of the flow reduction sequence number is provided below.

Table 1 is an example of a network topology database for the network shown in FIG. 1. A complete copy of this database is maintained at all of the network nodes. It can be seen from the table that the database includes each of the network nodes and each link associated with one of the network nodes. Each of the links in the network is defined in two different directions. For example, one record for link A defines that link as running from network node NN1 to NN2. The other record for link A defines that link as running from network node NN2 to NN1. The dual definition reflects the fact that the links are "owned" by different nodes, depending on the link direction used in setting up routes.

TABLE 1

| Network Topology Database | | | | | |
|---|---|---|---|---|---|
| node NN1 | links A | NN1-NN2 | B NN1-NN3 | C NN1-NN4 |
| node NN2 | links A | NN2-NN1 | D NN2-NN3 | H NN2-NN5 |
| node NN3 | links B | NN3-NN1 | D NN3-NN2 | E NN3-NN4 |
|  | G | NN3-NN6 |  |  |
| node NN4 | links C | NN4-NN1 | E NN4-NN3 | F NN4-NN7 |
| node NN5 | links H | NN5-NN2 | I NN5-NN6 |  |
| node NN6 | links G | NN6-NN3 | I NN6-NN5 | J NN6-NN7 |
|  | K | NN6-NN8 |  |  |
| node NN7 | links F | NN7-NN4 | J NN7-NN6 | L NN7-NN8 |
| node NN8 | links K | NN8-NN6 | L NN8-NN7 |  |

Each network node also maintains a local topology database that identifies both the network resources "owned" by that network node and local links to connected end nodes. Local links are not considered to be part of the network topology. Table 2 is an example of a local topology database for network node 2. It will be noticed that Table 2 defines each communication link only once as extending from the network node to another network node or end node.

The local topology database is actually a subset of the network topology database, at least with respect to network resources. A single set of resource records exists at any network node. Each record contains the "owner" field, which defines that resource as belonging either to the network topology, to both the network and the local topology, or only to the local topology.

TABLE 2

| Local Topology Database (NN2) | |
|---|---|
| node NN2 | |
| links A | NN2-NN1 |
| D | NN2-NN3 |
| H | NN2-NN5 |
| M | NN2-EN1 |
| N | NN2-EN2 |
| O | NN2-EN3 |

The resource characteristics defined by the topology databases are those characteristics dealing with the use of the resource for communications purposes. Table 3 below is a set of representative characteristics for a network node. Because the names given each characteristic are largely self-explanatory and because the characteristics are being listed for illustrative purposes only and are not essential to an understanding of the present invention, there will be not detailed discussion of the characteristics. It should be noted that each characteristic is defined as being either static or dynamic and as having either a binary or a multiple value. A static resource is one that is not changed during network operation. A dynamic characteristic, on the other hand, may change during network operation. Where a characteristic is said to have a binary value, that means the characteristic either does or does not exist. For example, a binary value of 1 would be assigned to the intermediate routing function entry for a network node only if that node were capable of performing that function. Otherwise, a binary value of 0 would be assigned. Where the node characteristic may take on more than two values, the value type is referred to as a multiple value.

TABLE 3

| Node Characteristics | | |
|---|---|---|
| Characteristic | Static/Dynamic | Binary/Multiple Value |
| central directory function | dynamic | binary |
| intermediate routing func. | static | binary |
| congestion | dynamic | binary |
| intermediate routing resources depleted | dynamic | binary |
| quiescing | dynamic | binary |
| route addition resistance | dynamic | multiple |

Table 4 shows link characteristics which would be maintained in the topology databases. The link characteristics are used to establish communications between remote nodes in a way which minimizes communication costs while meeting other communications needs, such as the need for a particular level of security for a given communication.

TABLE 4

| | Link Characteristics | |
|---|---|---|
| Characteristic | Static/Dynamic | Binary/Multiple Value |
| cost per byte | dynamic | multiple |
| cost per connect time | dynamic | multiple |
| security level | dynamic | multiple |
| modem class | dynamic | multiple |
| effective capacity | dynamic | multiple |
| propagation delay | either | multiple |
| quiescing | static | binary |
| operational | dynamic | binary |

In carrying out the present invention, extensive use is made of the flow reduction sequence number of FRSN. The FRSN is a number assigned to each topology database update message by the node generating the message. The FRSN value is incremented by the node for each new topology database update message within a "circular number space" discussed below. A circular number space is one having a maximum value. If a count being kept increases beyond that maximum value, the count "circles back" or returns to a minimum value.

In a preferred embodiment of the invention, the FRSN is an unsigned integer in the range of zero to $2^{32} - 1$. Each node maintains its own FRSN independently.

When a node increments its FRSN, it increments it by one. If this causes an overflow, the FRSN is reset to one rather than zero. A zero FRSN value is used for a special purpose described in more detail later.

In a number of instances, the relative value of two FRSNs must be compared. A standard algorithm is employed for comparing two numbers in a circular number space. That algorithm provides that a number S is greater than a number R if:

$S > R$ and $S - R < (\frac{1}{2}) \times 2^{32}$; or
$S < R$ and $R - S > (\frac{1}{2}) \times 2^{32}$.

Table 5 is a chart of the various FRSN values that are stored in each network node's topology database.

TABLE 5

FRSN Values Stored at Node B

Figure 3:
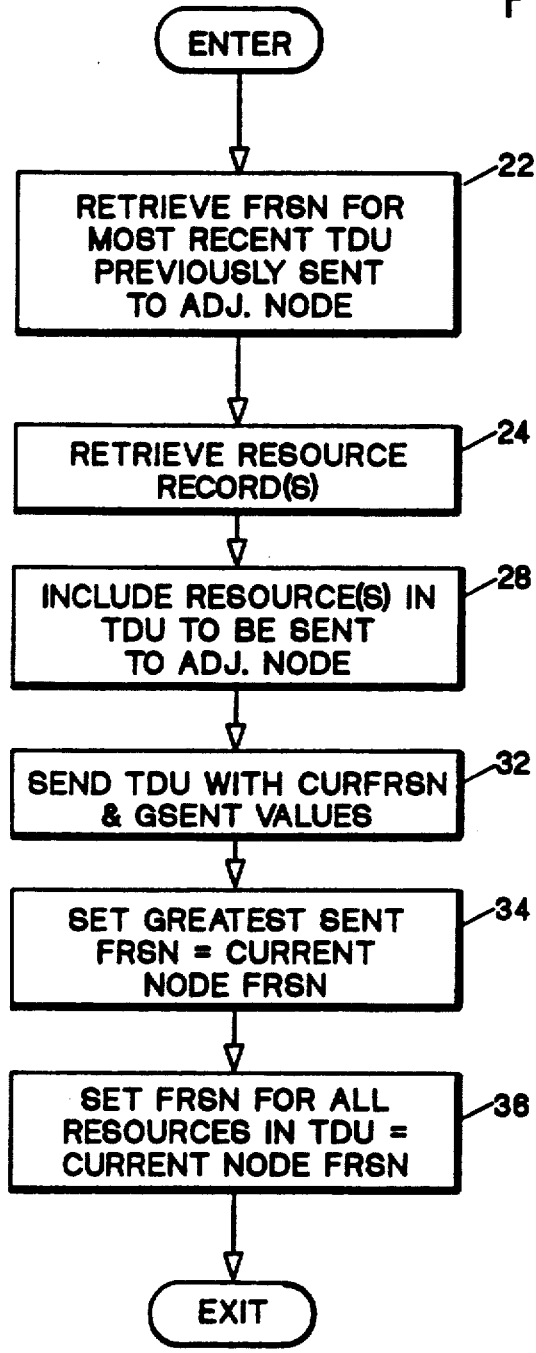
FIG. 3 is a flow chart of operations performed at a network node when that node generates a topology database update message to be sent to adjacent nodes during normal network operation.

Adjacent Node Control Block (ANCB) for Node A
FRSN of most recent TDU to Node A (GSENT)
FRSN of most recent TDU received from Node A (GRCVD)
Adjacent Node Control Block (ANCB) for Node C
FRSN of most recent TDU to Node C (GSENT)
FRSN of most recent TDU received from Node C (GRCVD)
Current node FRSN value (CURFRSN)
For each resource record stored in node topology database FRSN of most recent TDU sent to any node including that resource A network node will send topology database update messages to adjacent nodes for several reasons even if there has been no interruption in the connection between the nodes. If a resource is added to or deleted from the topology database stored at the network node or if a characteristic of that resource changes, the node prepares and broadcasts a topology database update message to all adjoining nodes other than a node from which the resource information might have been received in the form of an earlier topology database update message. FIG. 3 is a flow chart of the operations performed during normal network operations. When a decision is made that a topology database update message is to be sent to an adjacent node, the sending node retrieves the FRSN (operation 22) for the topology database update message most recently sent to that node. The sending node retrieves the resource record (operation 24) and writes the next topology database update message intended to be sent to the adjacent node (operation 28).

The topology database update message is then sent (operation 32) to the adjacent node. For reasons to be discussed later, the message includes CURFRSN (the FRSN for the current topology database update message) and GSENT, the FRSN for the most recent topology database update message previously sent to the same node.

The sending node updates the ANCB for the adjacent node by setting the stored GSENT value equal to the current node FRSN. This is carried out in operation 34. The sending node also updates the individual resource records included in the topology database update message by recording the current FRSN in the flow reduction sequence number field of the resource record. The resource records are updates in an operation 36.

Figure 4:
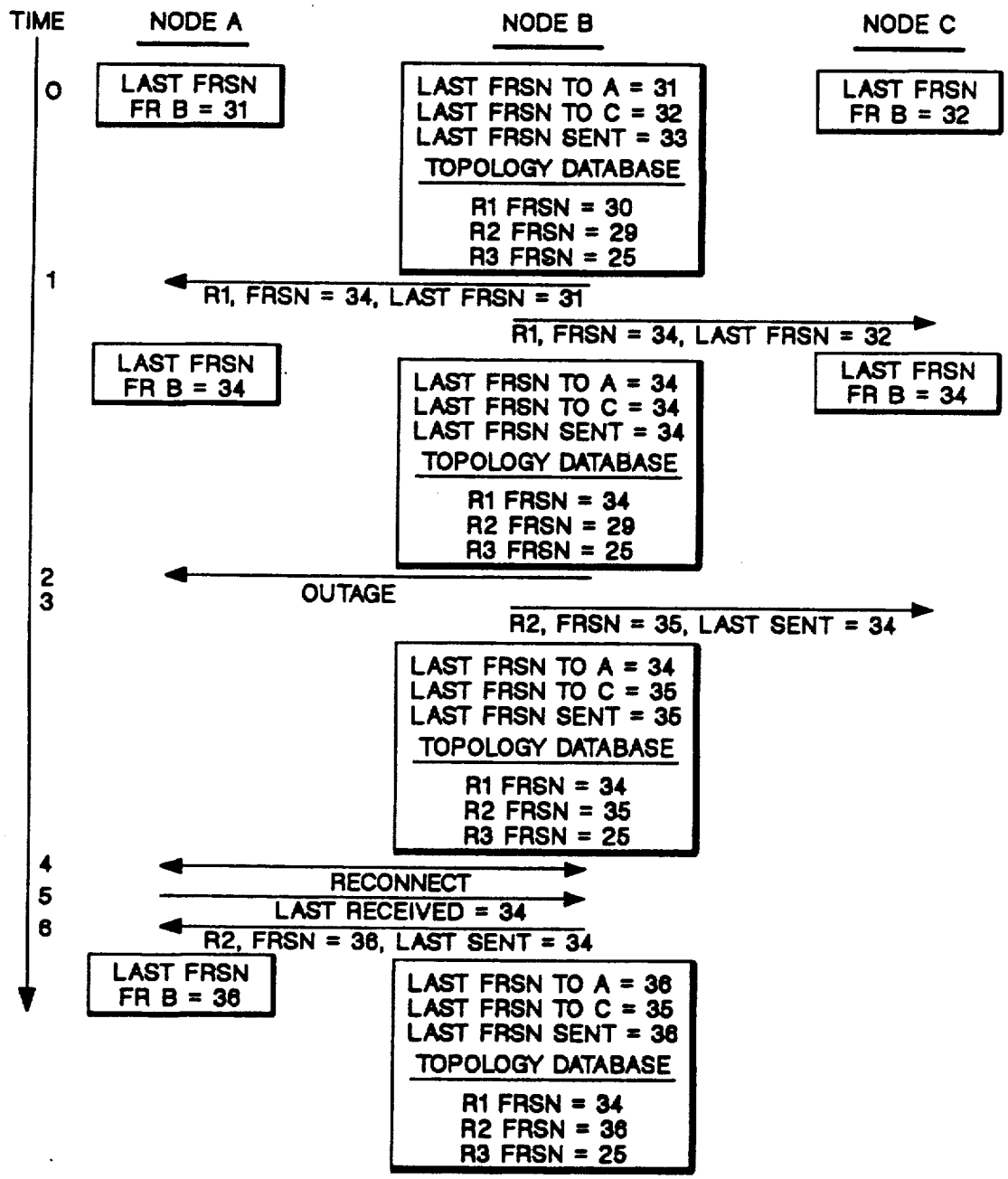
FIG. 4 is a time chart illustrating the use of flow reduction sequence numbers in the generation of topology database update messages both during normal network operation and as a result of an outage between nodes.

FIG. 4 is an example of the use of FRSNs in the updating of network node topology databases. The figure is time dependent with earliest chronological actions occurring at the top of the figure and latest chronological actions occurring at the bottom of the figure. Notice should be taken of the time line appearing along the left side of the figure. The numerical values on the time line are used in the following description.

For purposes of description, a simple three-node network is assumed with a central node (node B) being linked to nodes A and C. The description will cover, in some detail, the operations performed at node B, including changes made in FRSN values stored at node B.

At time T0, records at node B will show the last topology database update message sent to node A has a FRSN value of 31 while the last topology database update message to node C had a FRSN value of 32. Node B records would also show that the last topology database update message sent to any node has a FRSN value of 33. In the topology database maintained at node B, the resource record for a resource R1 will include a FRSN field with a value of 30. FRSN fields for resource records for resources R2 and R3, respectively, will have values 29 and 25, respectively. It will be noted that the FRSN values in the resource records are lower than the FRSN values of the topology database update messages sent to any node, indicating that resources R1-R3 have not been included in any recent topology database update messages.

At time T0, the contents of the adjacent node control block maintained at node A will show the last topology database update message received from node B has a FRSN value of 31. Similarly, the adjacent node control block maintained at node C will show the last topology database update message from node B has a FRSN value of 32.

At time T1, it is assumed that some change in the characteristic or availability of resource R1 requires that node B send topology database update messages to both nodes A and C. Through the use of the process described earlier with reference to FIG. 3, node B will generate and send a topology database update message to node A including the resource information, a current node FRSN value (34) assigned to the topology database update message by node B and the FRSN value (31) of the most recent topology database update message previously sent to node A by node B. The latter value is referred to as the GSENT value.

The topology database update message sent by node B to node C at time T1 will also contain information about resource R1, the current node B FRSN and the FRSN (GSENT) for the last topology database update message previously sent to node C by node B.

Upon sending the topology database update messages, node B will update its local records to reflect the FRSN value of the transmitted topology database update message. The resource record for resource R1 in node B's topology database will also be updated with the FRSN of the topology database update messages sent to nodes A and C. At time T1, both nodes A and C will update the adjacent node control block they maintained for node B to include the FRSN value of the topology database update messages received at time T1.

At time T2, it is assumed that an outage occurs breaking the connection between nodes A and B. Node B is assumed to remain connected to node C during the outage. At time T3, a change in the state of resource R2 requires node B send a topology database update message to node C. In sending this topology database update message, node B must update its record of the most recent FRSN sent to node C and of the most recent FRSN sent to any node, which in this case happens to be node C. The FRSN field for the resource record for resource R2 will be updated with the FRSN value assigned to the topology database update message sent to node C at time T3.

Obviously, since nodes A and B are not connected at time T3, no topology database update message can be sent by node B to node A.

At time T4, nodes A and B are shown as being reconnected. As part of the reconnection process, node B sets up what is referred to as a control point-to-control point (CP-CP) session with node A and requests information about the control point capabilities of node A. As part of this process, node A notifies node B of the FRSN value of the most recent topology database update message received from node B. Node B uses the FRSN value received from node A to determine which of its resources it should include in a topology database update message to be returned to node A. Node B compares the FRSN value received from node A with the FRSN field for each of the resources identified in its copy of the network topology database. If the FRSN field in a resource record has a value greater than the FRSN received from node A, that resource is included in the topology database update message to be returned to node A.

In the given example, only resource R2 has a FRSN field with a value exceeding the FRSN of the most recent topology database update message received by node A from node B. At time T6, the topology database update message is sent to node A with information about resource R2, the current FRSN value for node B and the FRSN value of the last topology database update message sent to node A by node B. Node B's records are updated to reflect the FRSN value assigned to this topology database update message. Only the resource record for resource R2 is updated since neither resource R1 nor R3 has included in the topology database update message sent to node A. Node A also updates its records with the current FRSN value contained in the topology database update message.

Figure 5:
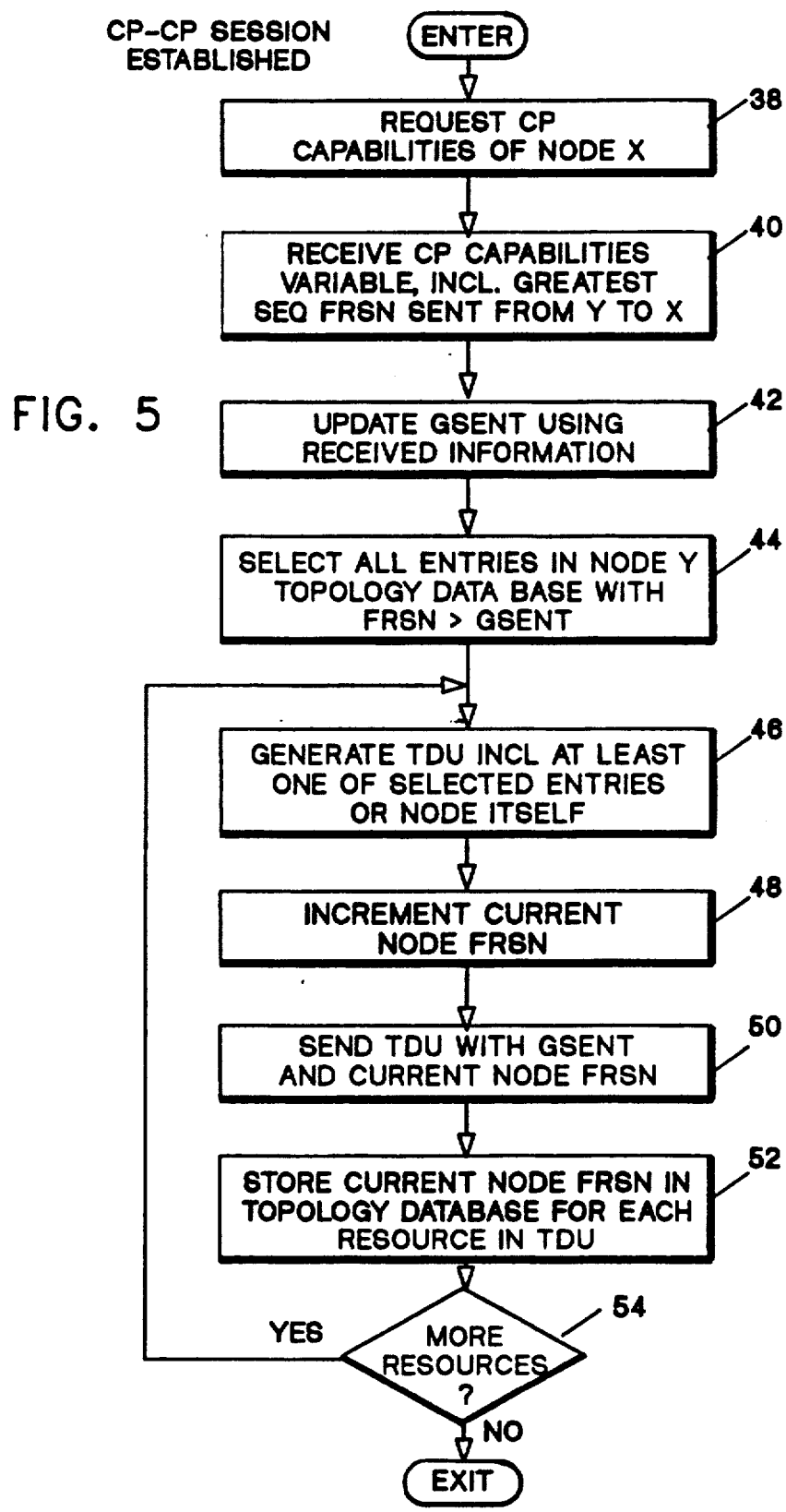
FIG. 5 is a flow chart of operations that are performed by a network node in generating a topology database update message to be sent to an adjacent node to which it is being newly connected or reconnected.

FIG. 5 is a flow chart of operations that are performed at a single node then that node becomes connected to an adjacent node. In FIG. 5, the nodes are referred to arbitrarily as nodes X and Y.

When a CP-CP session has been established, the local node (node Y) sends a request (operation 38) to node X for the CP or control point capabilities of node X. Node Y then waits to receive a messages including the control point capabilities of node X (operation 40). The message also includes the FRSN for the greatest sequential topology database update message previously received by node X from node Y. Sequential topology database update messages are those in which the assigned FRSN value are only one number apart. In an operation 42, node Y will update the GSENT value in its adjacent node control block for node X using the FRSN value received from node X in the previous operation.

Node Y will select all entries in its topology database having a FRSN field with the value greater than the updated GSENT value. This occurs in operation 44. If GSENT=0, node Y interprets this as a request to include all resources in its topology database in topology database messages to node X. This would occur if node X were new to the network. When the resources to be included in the topology database update message have been selected, the topology database update message is generated in an operation 46. The current node FRSN value is incremented in operation 48 and the topology database update message is sent (operation 50) with the resource information, the current node FRSN value for node Y and the FRSN value of the topology database update message most recently sent to node X. Node Y then updates the resource records (operation 52) for each resource included in the topology database update message just sent.

A topology database update message may include more than one resource. However, it may not be possible to include all resources in a single topology database update message. Since multiple topology database update messages may be necessary, a check is made (operation 54) as to whether more resources should be included in subsequent topology database update messages to be sent to node X. If there are, additional topology database update messages are generated using the operations 46, 48, 50 and 52. If there aren't, the process is exited.

Figure 6:
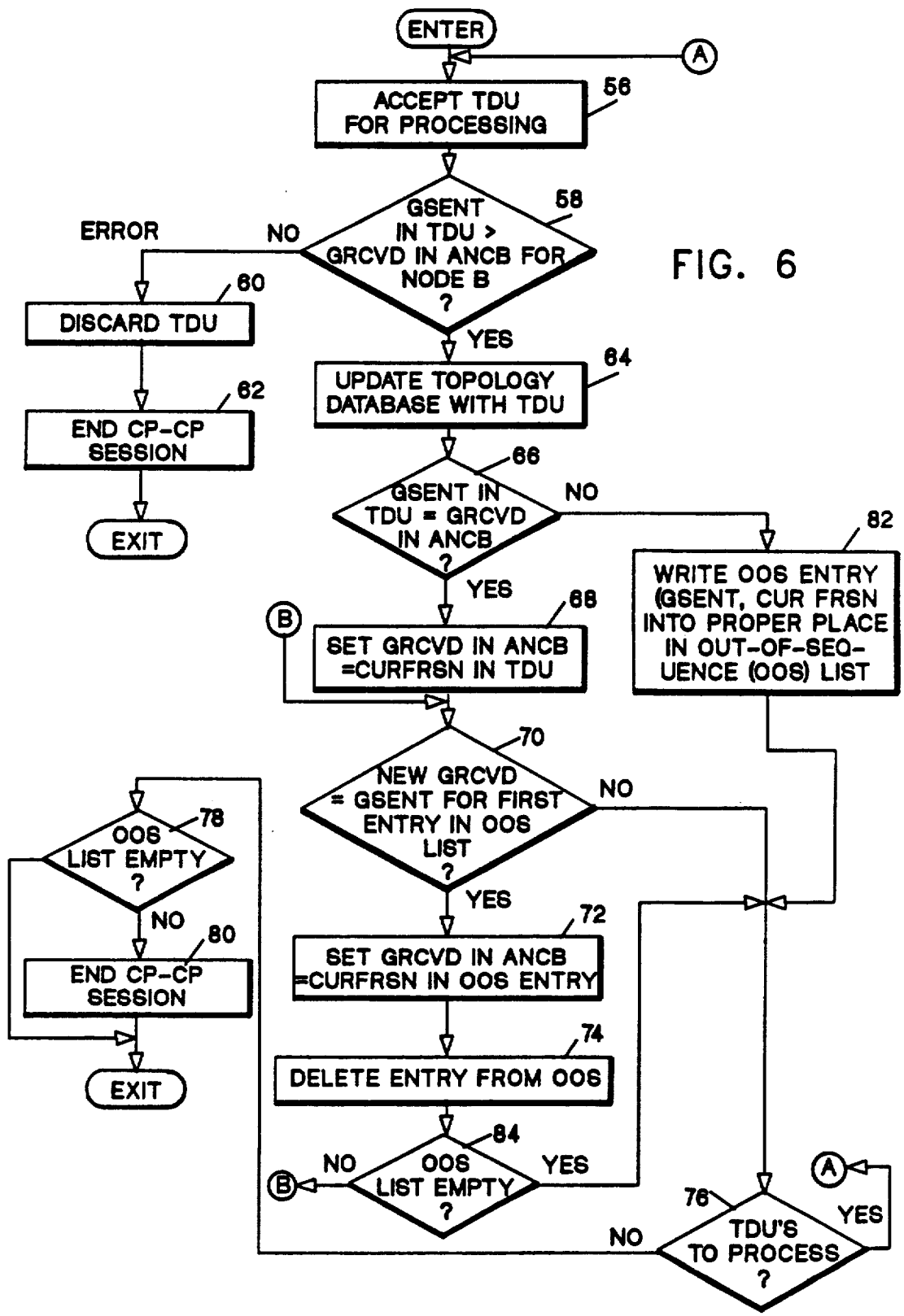
FIG. 6 is a flow chart of operations that are performed by a network node receiving a topology database update message.

FIG. 6 is a flow chart of operations performed at a node to process a topology database update message received from an adjacent node. Once the topology database update message is accepted for processing (operation 56) an immediate check is made (operation 58) to determine whether the GSENT variable in the topology database update message is greater than GRCVD, the FRSN value stored a node Y for the most recent topology database update message received from node X. A valid topology database update message cannot have a FRSN value lower than the FRSN value of a topology database update message previously sent to the same node. Therefore, if operation 58 shows that to have been the case, an error condition must exist. Node Y discards the topology database update message in an operation 60 and ends the CP-CP session between nodes X and y in operation 62. The effect of ending the CP-CP session is to cause the network to repeat the attempt to reconnect nodes X and Y with the expectation that the error condition will not reoccur.

If the received topology database update message contained any FRSN number greater than the FRSN number stored in the adjacent node control block at node Y, the contents of the topology database update message are used (operation 64) to update the topology database copy kept at node Y. At this point, node Y may rebroadcast the TDU to its neighbor nodes.

While nodes sending topology database update messages will send those topology database update messages in the proper sequence, it is possible for the topology database update messages to be processed out of sequence by a receiving node. For that reason, checks must be made to determine whether the received topology database update message has been processed in sequence or out of sequence. The GSENT variable in the topology database update message is compared (operation 66) with the GRCVD variable stored in the adjacent node control block for node X. If the two variables are equal, meaning the last topology database update message sent by node X has the same FRSN value as the last topology database update message received at node Y, the current topology database update message has been processed in the proper sequence. The GRCVD variable in the adjacent node control block is updated in operation 68 by setting it equal to the current node FRSN value received in the topology database update message. Because other topology database update messages from X may have been processed out of sequence, node Y must maintain an out of sequence (OOS) list of processed topology database update messages for each adjacent node. Each entry on this list will include two variables. The first variable is the current node FRSN (CURFRSN) sent with the topology database update message. The second variable is the FRSN of the topology database update message that preceded the topology database update message or GSENT. The OOS list entries are sorted numerically by GSENT value with those having the lowest variables at the beginning of the list. Since a topology database update message that is processed in sequence may "fill in a gap" in the out of sequence list, a check 70 is made to determine whether the newly updated GRCVD variable is equal to the GSENT variable for the first entry on the OOS list. That can occur if the just processed topology database update message was received earlier than a topology database update message on the OOS list but was processed later. Assuming a positive result from operation 70, the GRCVD variable stored in the adjacent node control block would be set equal (operation 72) to the current FRSN variable stored in the OOS entry since the just received topology database update message would effectively fill in a gap in the sequence of processed topology database update messages. The entry would then be deleted (operation 74) from the OOS list and a check (operation 84) made whether all entries on the OOS list have been detected. If there is a negative result from operation 84, the process repeats from operation 70. If there is a positive result from operation 84 or negative result for operation 70, a check (operation 76) is made to determine whether other topology database update messages from node X have been queued for process at node Y. If other topology database update messages remain to be processed, the entire process beginning at operation 56 is repeated. If no other topology database update messages remain to be processed, a second check 78 is made to determine whether all entries on the OOS list have been deleted. If any entry remains on the OOS list after all topology database update messages have been processed, an unacceptable "permanent" gap will exist in the topology database update messages received at node Y from node X. This is an error condition which will cause the CP-CP session to be terminated in an operation 80. When the CP-CP session is terminated, the two nodes will attempt to re-establish connection so that the entire process will be repeated. Of course, any topology database update messages successfully received and processed will not be repeated when the connection is re-initiated.

If operation 66 has shown that the GSENT variable in the topology database update message was not equal to the GRCVD variable stored in the adjacent node control block, that would mean that the topology database update message has been processed out of sequence. The GSENT variable could not be less than the GRCVD variable, however, at this point in the process since operation 58 would have flagged that as an error condition, which would have resulted in the discarding of the topology database update message. If the result of check 66 is negative, an entry is written into the out of sequence list (operation 82) with the current FRSN value and the GSENT value from the topology database update message. Once operation 82 is completed, a check is made as to whether other topology database update messages remain to be processed.

While there has been described what is considered to be a preferred embodiment of the invention, variations and modifications will occur to those skilled in the art once they become aware of the basic concepts of the invention. Therefore, it is intended that the appended claims shall be construed to include not only the preferred embodiment but all such variations and modification as fall within the true spirit and scope of the invention.

We claim:

1. For use at each network node in a communications network wherein each said node maintains a topology database comprising individual records defining individual network resources by sending topology database update messages to adjacent nodes and receiving topology database update messages from adjacent nodes, each of said messages containing information about at least one network resource defined in the topology database of a sending node, a method of reducing the amount of information that must be sent to adjacent nodes to update the topology databases stored at those nodes, said method comprising the steps of:
   assigning a unique sequence number to each topology database update message generated by the sending node;
   maintaining a record of the sequence number of the most recent topology database update message sent to each adjacent node and, for each individual resource defined in the topology database, the sequence number of the most recent topology database update message including that resource; and
   including in any topology database message sent to an adjacent node only that resources having a recorded sequence number newer than the sequence number of the most recent topology database update message previously sent to that node.

2. For use at each network node in a communications network wherein each said node maintains a topology database comprising individual records defining individual network resources by sending topology database update messages to adjacent nodes and receiving topology database update messages from adjacent nodes, each of said messages containing information about at least one network resource defined in the topology database of a sending node, a method of reducing the amount of information that must be sent to an adjacent node upon establishment of a connection with that node, said method comprising the steps of:
   assigning a unique sequence number to each topology database update message generated by the sending node;
   maintaining a record of the sequence number of the most recent topology database update message sent to each adjacent node and, for each individual resource defined in the topology database, the sequence number of the most recent topology database update message including that resource;
   upon establishment of a connection with an adjacent node,
      receiving, from said adjacent node, the sequence number of the most recent topology database update message actually received by that node,
      comparing the sequence number received from that node with the sequence number assigned to the individual resources defined in the topology database; and
      including in the topology database update message to be sent to the adjacent node only those resources having a recorded sequence number newer than the sequence number of the most recent topology database update message reported as having been received by said adjacent node.

3. A method as defined in claim 2 wherein the node receiving a topology database update message processes that message by:
   retrieving the sequence number of the most recent topology database message previously received from the node sending the current topology database update message; and
   comparing the sequence number assigned to the current topology database update message tot eh retrieved sequence number; and
   updating the topology database utilizing the current topology database update message only where the sequence number assigned to that message is newer than the retrieved sequence number.

4. For use at each network node in a communications network wherein each said node maintains a topology database comprising individual records defining individual network resources and wherein said node is capable of sending topology database update messages to adjacent nodes and receiving topology database update messages from adjacent nodes, each of said messages containing information about at least one network resource defined in the topology database of a sending node, a method of reducing the amount of information that must be sent to an adjacent node to provide updates about the network resources defined at the sending node, said method comprising the steps of:
   assigning a unique sequence number to each topology database update message generated by the sending node;
   maintaining a record of the sequence number of the most recent topology database update message sent to each adjacent node and, for each individual resource defined in the topology database, the sequence number of the most recent topology database update message including that resource;
   upon establishment of a need to send a topology database update message to adjacent nodes, comparing the sequence number of the most recent topology database update message previously sent to each node with the sequence number assigned to the individual resources defined in the topology database; and including in the topology database update message to be sent to the each node only those resources having a recorded sequence number newer than the sequence number of the most recent topology database update message previously sent to the same node.

5. A method as defined in claim 4 wherein the node receiving a topology database update message processes that message by:

retrieving the sequence number of the most recent topology database message received from the node sending the current topology database update message;

comparing the sequence number assigned to the current topology database update message to the retrieved sequence number; and updating the topology database utilizing the current topology database update message only where the sequence number assigned to the message is newer than the retrieved sequence number.

6. A method as defined in claim 5 further including the steps of:

discarding without use any received topology database update message not having a sequence number newer than the retrieved sequence number; and terminating the connection between the nodes;

7. For use at each network node in a communications network wherein each said node maintains a topology database comprising individual records defining individual network resources and wherein said node is capable of sending topology database update messages to adjacent nodes and receiving topology database update messages from adjacent nodes, each of said messages containing information about at least one network resource defined in the topology database of a sending node, a method of reducing the amount of information that must be sent to an adjacent node when a connection between said nodes is re-established, said method comprising the steps of:

causing each node to assign a unique sequence number to each topology database update message generated by a sending node, and to maintain a record of the sequence number of the most recent topology database update message sent to each adjacent node and, for each individual resource defined in the topology database, the sequence number of the most recent topology database update message sent to any adjacent node including information about that resource;

upon establishment of a connection between two nodes;

causing a first of said nodes to send a request for a topology database update message to the second of said nodes, said request containing the sequence number of the most recent topology database update message previously received from the second node of a unique sequence number if no topology database update messages have been received from the second node, causing the second of said nodes to respond either with a topology database update message including only individual records for network resources having recorded sequence numbers newer than the sequence number received from said first node or, if the unique sequence number was received, with a topology database update message including the individual records for all network resources in the topology database of said second node.

8. A method as defined in claim 7 wherein said first node:

maintains a record of the sequence number of the most recent topology database message received from said second node; and updates the topology database utilizing a topology database update message received from said second node only where the sequence number of said message is newer than the recorded sequence number for the most recent topology database message previously received from said second node.

* * * * *